United States Patent [19]
Takayama

[11] 3,874,742
[45] Apr. 1, 1975

[54] HYDRAULIC BRAKE PRESSURE CONTROL SYSTEM

[75] Inventor: Katuki Takayama, Chiryu, Japan

[73] Assignee: Aisin Seiki Kabushiki Kaisho, Kariya, Japan

[22] Filed: Sept. 27, 1973

[21] Appl. No.: 401,132

[30] Foreign Application Priority Data
Sept. 27, 1972 Japan.............................. 47-09679

[52] U.S. Cl.............. 303/21 F, 303/10, 303/21 A, 303/21 AF, 303/21 BE
[51] Int. Cl.............................................. B60t 8/06
[58] Field of Search...................... 303/21 F, 21 AF; 188/181 A, 181 T; 303/61–63, 68–69, 10, 21 BE, 52, 54, 50

[56] References Cited
UNITED STATES PATENTS

| | | |
|---|---|---|
| 3,401,984 | 9/1968 | Williams et al.................... 303/21 F |
| 3,635,531 | 1/1972 | Okamoto et al................... 303/21 F |
| 3,659,905 | 5/1972 | Goulish ............................ 303/21 F |
| 3,661,429 | 5/1972 | Kito..................................... 303/54 |
| 3,675,422 | 7/1972 | Drutchas et al................... 303/21 F |
| 3,679,270 | 7/1972 | Jania ................................. 303/21 F |
| 3,827,763 | 8/1974 | Kobashi............................. 303/21 F |

Primary Examiner—Trygve M. Blix
Assistant Examiner—D. C. Butler
Attorney, Agent, or Firm—Oblon, Fisher, Spivak, McClelland & Maier

[57] ABSTRACT

A hydraulic brake pressure control system comprising a spool valve which reacts proportionally to a pedal depressing force for controlling hydraulic communication between inlet, outlet and drain ports, the spool valve having, at both sides thereof, hydraulic pressure receiving areas which are exposed to hydraulic pressure, and an actuator for controlling the hydraulic pressure acting on the receiving areas in accordance with a signal indicative of an optimum brake control operation.

10 Claims, 3 Drawing Figures

3,874,742

HYDRAULIC BRAKE PRESSURE CONTROL SYSTEM

BACKGROUND OF THE INVENTION

1. Field of the Invention

The present invention relates to a hydraulic brake pressure control system for a vehicle, and more particularly to a hydraulic brake pressure control system for a vehicle for controlling and modifying the brake pressure obtained by a depressing force of a brake pedal in accordance with an electric signal indicative of an optimum brake control operation.

2. Description of the Prior Art

Conventionally, various hydraulic brake pressure control systems have been proposed. Such systems include a control valve assembly for on-off control of the hydraulic communication between a source of brake pressure and brake means in response to the pedal depressing force, and furthermore, such systems include another control valve apparatus for controlling and modifying the brake pressure in accordance with an electric signal indicative of the optimum brake control operation. The control valve assembly is arranged independently of the control valve apparatus in construction, although the control valve assembly and control valve apparatus are hydraulically associated with each other. Therefore, such systems have been complicated in construction and comparatively high in cost.

SUMMARY OF THE INVENTION

It is, therefore, an object of the present invention to provide an improved hydraulic brake pressure control system which is relatively simple in construction and low in cost.

Another object of the present invention is to provide an improved hydraulic brake pressure control system wherein a control valve which is operated by a brake pedal is formed integrally with or is mechanically associated with an electric signal indicative of an optimum brake control operation.

A still further object of the present invention is to provide an improved hydraulic brake pressure control system wherein the change-over valve assembly also acts as an unloading valve.

These and other objects of the present invention are provided by an improved hydraulic brake pressure control system wherein a change-over valve assembly is further provided between a brake pressure control valve assembly, a hydraulic pump and an accumulator, whereby the hydraulic pressure control system will be selectively operated by the hydraulic pressure delivered from the pump or the accumulated pressure in the accumulator. The control system utilizing the hydraulic pressure from the pump is known as an open circuit type and the control system utilizing the accumulated pressure is known as a close circuit type and, therefore, the brake operation according to the present invention will be selectively attained under the open or close circuit type.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several figures, and wherein.

DETAILED DESCRIPTION OF THE PREFERRED EMBODIMENTS

Figure 1:
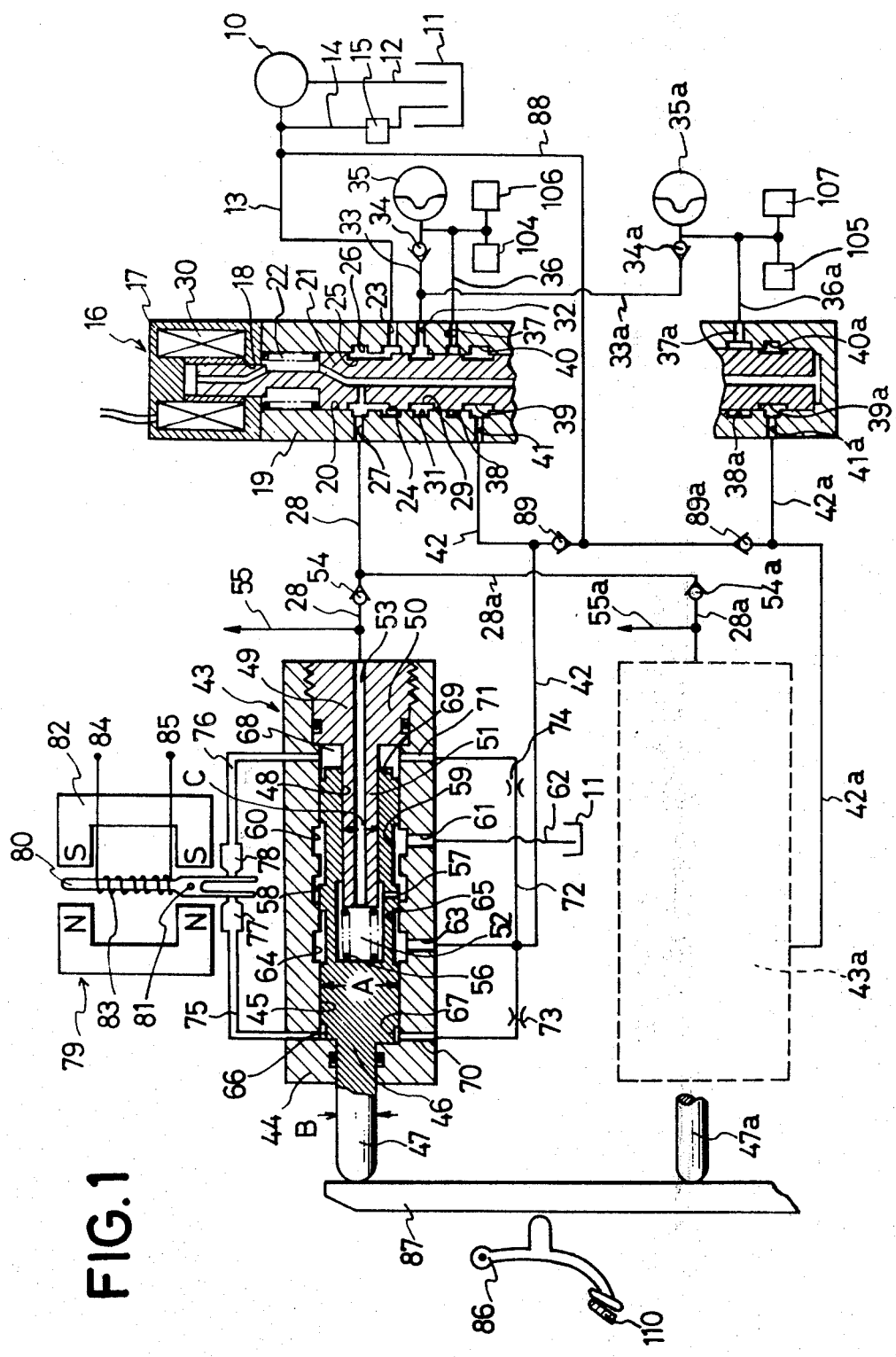
FIG. 1 is a schematic view, with some component parts being shown in cross-section, of an embodiment of a hydraulic brake pressure control system constituted according to the present invention.

Referring now to the drawings, the numeral 10 denotes a hydraulic pump which is driven by a vehicle engine (not shown). The pump 10 is hydraulically connected to a reservoir tank 11 via a conduit 12 and delivers the hydraulic pressure from the reservoir 11 to a conduit 13. Disposed within a return conduit 14 between the conduit 13 and the reservoir 11 is a conventional relief valve 15 which acts so as to relieve excessive hydraulic pressure within the conduit 13. Thus the hydraulic pressure delivered from the pump 10 will be substantially maintained at a predetermined pressure.

The numeral 16 represents a change-over valve assembly, for example of the solenoid operated type, which is normally positioned in an inoperative position as illustrated. The change-over valve assembly 16 comprises housings 17 and 19 having cylindrical bores 18 and 20 respectively, a spool valve 21 slidably mounted within the bores 18 and 20, and a spring 22 biasing the spool valve 21 into its inoperative position. The housing 19 is formed with an inlet port 23 which is adapted to receive the hydraulic pressure within the conduit 13. The inlet port 23 is hydraulically connected to an outlet port 27, also formed in the housing 19 and, thence, to a conduit 28 through an annular groove 24 of the housing 19, an annular groove 25 of the spool valve 21, and an annular groove 26 of the housing 19 when the change-over valve assembly 16 is in its illustrated position.

The change-over valve assembly 16 also includes a solenoid 30 accommodated in the housing 17. Upon energization of the solenoid 30, as will be clear hereinafter, the spool valve 21 is moved upwardly against the biasing force of the spring 22, so that the annular groove 24 may communicate with an annular groove 29 of the spool valve 21 while hydraulic communication between the inlet and outlet ports 23 and 27 is interrupted. The annular groove 29 is hydraulically connected to an annular groove 31 of the housing 19 which is, in turn, is connected to a further outlet port 32 formed in the housing 19. Therefore, the hydraulic pressure from the pump 10 is transmitted to and is stored at accumulators 35 and 35a through conduits 33 and 33a having check valves 34 and 34a therein.

The accumulators 35 and 35a are connected via conduits 36 and 36a to further inlet ports 37 and 37a of the housing 19, respectively, which are opened to annular grooves 38 and 38a of the housing 19. The annular grooves 38 and 38a, which are normally interrupted from annular grooves 39 and 39a of the spool valve 21, respectively, may communicate with grooves 39 and 39a, respectively, when the spool valve 21 is shifted upwardly. The annular grooves 39 and 39a always communicate, respectively, with outlet ports 41 and 41a of the housing 19 through annular grooves 40 and 40a of the housing 19. Thus, the accumulated hydraulic pressure in the accumulators 35 and 35a will be conveyed to conduits 42 and 42a, respectively, when the spool valve 21 is in its operative position.

A control valve assembly 43 includes a housing 44 having a cylindrical bore 45, a spool valve 46 slidably mounted within the bore 45 and having a push rod portion 47 at one end thereof, and a spool 49 having large and small diameter portions 50 and 51. The large diameter portion 50 is threaded with the housing 44 to thereby form a part of the housing and the small diameter portion 51 is extended into a bore 48 of the spool valve 46 so as to act as a reaction member. A hydraulic chamber 52 is defined within the bore 48 by the reaction member 51 of the spool 49. The chamber 52 is hydraulically connected to the conduit 28 through a passage 53 provided with the spool 49. Disposed within the conduit 28 is a check valve 54 which allows the flow of hydraulic fluid from the change-over valve assembly 16 only to the control valve assembly 43. A branch conduit 55 from the conduit 28 between the control valve assembly 43 and the check valve 54 is hydraulically connected to the wheel cylinder brake means, not shown, of the vehicle. A spring 56 is inserted within the chamber 52 for biasing the spool valve 46 toward the left as viewed in FIG. 1. When the spool valve 46 is in its illustrated position, an annular groove 58 of the housing 44, which is connected to the chamber 52 through a passage 57 formed in the spool valve 46, is connected to the reservoir 11 through an annular groove 59 of the spool valve 46, an annular groove 60 of the housing 44, a port 61 of the housing 44 and a conduit 62. The accumulated hydaulic pressure within the accumulator 35 is transmitted via the conduit 42 to an inlet port 63 of the housing 44 and, thence, to an annular groove 64 of the housing 44 and to an annular groove 65 of the spool valve 46. An annular hydraulic chamber 66 defined within the bore 45 of the housing 44 by one end 67 of the spool valve 46 is connected to a branch conduit 72 from the conduit 42 through a port 70 provided in the housing 44. The conduit 72 has an orifice 73 between the port 70 and the conduit 42. The chamber 66 is also connected to a nozzle 77 via a conduit 75. Likewise, an annular hydraulic chamber 68 defined within the bore 45 of the housing 44 by the other end 69 of the spool valve 46 is hydraulically connected to the branch conduit 72 having an orifice 74 therein through a port 71 of the housing 44. The chamber 68 is further connected to a nozzle 78 via a conduit 76.

Figure 3:
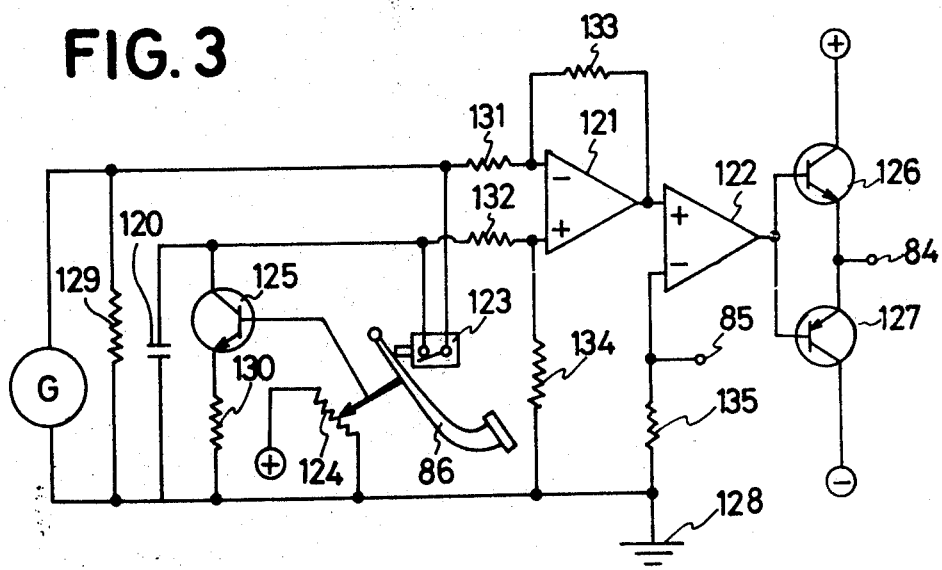
FIG. 3 is an electric circuit diagram for controlling an actuator arranged in the control system of FIG. 1.

The numeral 79 indicates an actuator or torque motor in which a flapper valve 80 is rotatably connected to a fixture, not shown, by a pin 81. One end of the flapper 80 is extended and positioned between the nozzles 77 and 78 and the other end thereof is wrapped by a coil 83 and extends between a pair of magnets 82. The flapper valve 80 is normally held in its illustrated neutral position, when a brake pressure control circuit, as shown in FIG. 3, delivers no signal, so that both nozzles 77 and 78 are closed. This condition results in that the hydraulic pressure within the chambers 66 and 68 will be equal to each other. Both end terminals 84 and 85 of the coil 83 may be connected to a circuit delivering a signal indicative of an ideal brake control operation, as will be more fully explained hereinafter referring to FIG. 3.

A control valve assembly 43a, which is shown only by a dotted line has substantially the same construction as that of the control valve assembly 43 and is operated in substantially the same manner as that of the control valve assembly 43. Therefore, the detailed explanation of the construction of the control valve assembly 43a will be omitted.

In the control valve assembly 43, an effective cross-sectional area B of the push rod 47 will be equal to an effective cross-sectional area C of the reaction member 51 and, thus, the effective diameters of the chambers 66 and 68 will be equal to each other.

Figure 2:
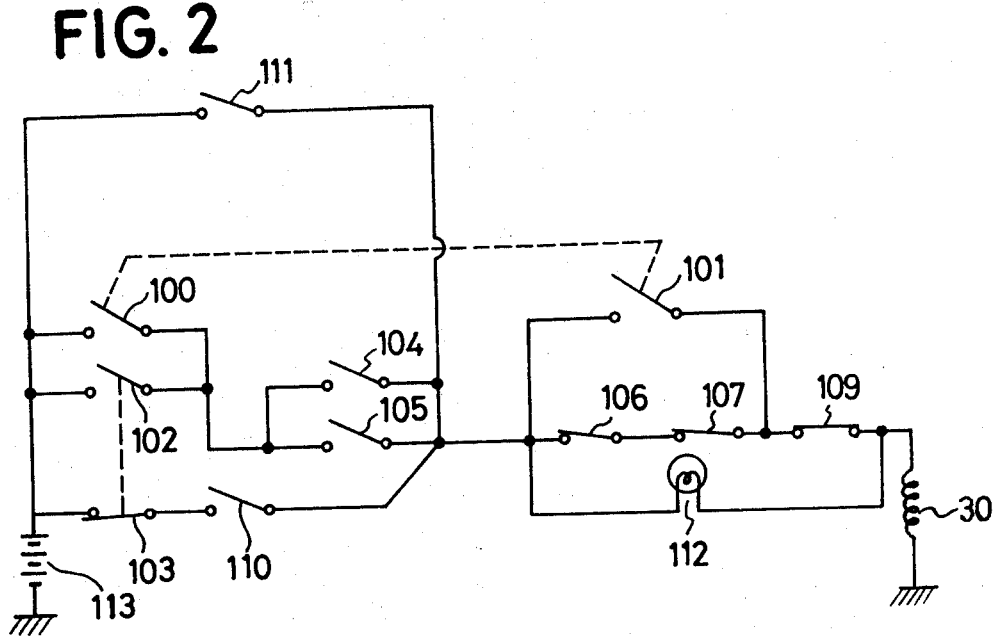
FIG. 2 is an electric circuit diagram for actuating a change-over valve assembly arranged in the control system of FIG. 1.

Referring now to FIGS. 1 and 2, when a conventional starter switch 100 is turned on, an associated switch 101 is also turned on to energize the solenoid 30 of the change-over valve assembly 16 unless a normally-closed safety switch 109 is turned off. Thus, the hydraulic pressure from the pump 10 will be accumulated in the accumulators 35 and 35a when the starter switch 100 is actuated. The safety switch 109 acts as an oil level sensing switch which will be turned off only when the brake oil decreases below a predetermined value. The numerals 104 and 105 denote switches which correspond to the accumulated pressures in the accumulators 35 and 35a, respectively. These switches 104 and 105 have conventional hysterisis characteristics in which the switches 104 and 105 will be turned on when the accumulated pressures decrease below a first predetermined pressure, but once the switches 104 and 105 have turned on, the switches 104 and 105 will not be turned off until the accumulated pressures exceed a second predetermined pressure which is higher than the first predetermined pressure. Therefore, even if a conventional ignition switch 102 is turned on, the solenoid 30 is not energized as long as the switches 104 and 105 are opened. In that case, the hydraulic pressure from the pump 10 is drained through the conduit 13, the change-over valve assembly 16, the conduit 28, the control valve assembly 43 and the conduit 62. Thus the change-over valve assembly 16 now acts as an unloading valve. Normally-closed alarm switches 106 and 107 will be turned on when the accumulated pressures are decreased below a critical pressure which is lower than the first predetermined pressure. If switches 106 and 107 are turned off when switches 104 and 105 are in the closed positions, or if the switch 109 is turned off, an alarm lamp 112 is turned on to alarm some trouble in the system. In this case, the solenoid 30 may be energized through the lamp 112. When the ignition switch 102 is turned off and thus an associated switch 103 thereof is turned on, the solenoid 30 is also energized upon the closing of a brake pedal-responsive switch 110. A control switch 111 corresponds to the electric circuit delivering the signal indicative of the optimum brake control operation, and when the control switch 111 is closed, the solenoid 30 is energized. The numeral 113 denotes a battery.

The solenoid 30 is energized in response to some switch's operation in FIG. 2. More particularly, when the ignition switch 102 is turned on, the hydraulic pressure from the pump 10 will be stored in the accumulators 35 and 35a. After the hydraulic pressures are stored sufficiently in the accumulators 35 and 35a, the solenoid 30 is deenergized by the operation of the switches 104 and 105. Thus, the brake control system will now be under the open circuit type, and the change-over valve assembly will act as the unloading valve. Under these conditions, when it is required that the brake system be operated under an antiskid control means or the like, as will be made clear hereinafter, the switch 111 is closed to energize the solenoid 30 in accordance with the signal which is delivered by the antiskid control means. The brake control system will be changed from the open circuit type to the closed circuit type.

Referring closely to FIG. 3 showing the circuit which delivers a signal indicative of the optimum brake control operation to control the torque motor 79, the symbol G indicates a direct current generator which rotates in synchronism with the rotation of the vehicle wheel and generates direct current voltage in proportion to the vehicle wheel speed. The numeral 121 is an operation amplifier acting as a differential amplifier for inversion and non-inversion inputs and amplifys the difference between the two inputs proportionally since it is established that resistance 131 equals resistance 132 and resistance 133 equals resistance 134. The numeral 122 denotes an operation amplifier which constitutes a constant current circuit for proportioning the voltage of an inversion input and the current of an output. The numeral 123 is a brake-responsive switch which is engaged when the brake pedal 86 is not being operated and becomes disengaged when the brake pedal 86 is applied. The numeral 124 is a brake-responsive variable resistance which varies the potential applied to the base of transistor 125 in response to movement of pedal 86.

When the brake is not applied, the voltage generated by the DC generator G is equal to the voltage charged in a condenser 120. In this case, the voltage which is generated by the generator G and the voltage which is charged in the condenser 120 correspond to an actual vehicle speed. Therefore, since the electric potentials of the two inputs into the operation amplifier 121 are the same, the output becomes zero. Accordingly, the output current of the operation amplifier 122, which acts as a constant circuit, marks zero, and no current flows through the coil 83.

Upon the brake being applied, the brake-responsive switch 123 becomes disengaged and the variable resistance 124 moves to the power source side in accordance with the depressing force of the brake pedal 86, thereby the base electric potential of transistor 125 rises and the electric current flowing into a collector of the transistor 125 increases in proportion to the base electric potential, and the electric load of the condenser 120 discharges passing through the collector-emitter of the transistor 125. Since the amount of discharge varies in proportion to the depressing force of the pedal 86, the electric potential charged in the condenser 120 is varied as a function of the braking force required by the driver. Therefore, the potential in the condenser 120, discharged in proportion to the braking force, is now considered as a pseudo-vehicle speed.

In case that the output voltage of the DC generator G, responsive to the wheel speed, is lower than the voltage of the condenser 120, that is, the wheel speed becomes lower than the pseudo-vehicle speed and there is an excessive braking force which causes skidding of the wheel, the output of the operation amplifier 121 marks positive and, thus, the output of the operation amplifier 122 also marks positive which permits continuity through transistor 126. Accordingly, current flows from the positive side of the electric power side to ground 128 through the collector-emitter of the transistor 126, the terminal 84, the coil 83, the terminal 85 and a resistance 135. Since this current is to be proportional to the input voltage of the inversion owing to the feedback circuit of the resistance 135, the braking force is to be reduced in proportion to the current value, that is, the output voltage of the operation amplifier 121 through the counter-clockwise rotation of the flapper 80.

In case the output voltage of the DC generator G is higher than the voltage of the condenser 120, that is, the wheel speed is higher than the pseudo-vehicle speed, the output of the operation amplifier 121 marks negative and, thus, the output of the operation amplifier 122 also marks negative which permits continuity through a transistor 127. Therefore, the current flows from ground 128 to the negative side of an electric power side through the resistance 135, the terminal 85, the coil 83, the terminal 84 and the emitter-collector of the transistor 127. Since the current flows inversely to the prior case, the braking force is to be increased in proportion to the output voltage of the operation amplifier 121 through clockwise rotation of the flapper 80.

However, the present invention can be applied not only to the abovementioned electric circuit providing the signal indicative of the optimum brake control operation, but also to other antiskid electric circuits. In addition, the present invention may be applied to means for automatically proportioning the brake pressure in response to the pedal depressing force, to means for controlling the distribution of the brake pressure to each of the wheels, to the car between distance adjustment means for suitably retaining the distance between cars by controlling the brake force by means of electrical signals without any connection with the driver's intention for applying the brake, to means for always giving a small pressure to the hydraulic brake line to thereby detect any trouble in the hydraulic brake line during travel of the vehicle, or to means for holding the brake pressure when the vehicle is stopped.

Assuming that the change-over valve assembly 16 is in its illustrated position, the hydraulic fluid from the pump 10 is drained through the conduit 13, the change-over valve assembly 16, the conduit 28, the control valve assembly 43 and the conduit 62. Therefore, the brake control system will now be under the open circuit type. Under these conditions, when the brake pedal 86 is depressed, the spool valve 46 is moved to the right through the lever 87 and the push rod 47 to reduce the close hydraulic communication between grooves 58 and 59. Thus, the hydraulic pressure rises within the conduit 28 and is then transmitted to the brake means via the conduit 55. This hydraulic brake pressure within the chamber 52, which is connected to conduit 28, urges the spool valve 46 leftwardly against the pedal depressing force acting on the push rod 47. Therefore, the spool valve 46 will be balanced and the hydraulic brake pressure is increased in proportion to the pedal depressing force. In case that the brake pedal 86 is released, the spool valve 46 is returned by the hydraulic pressure within the chamber 52 and the force of spring 56 such that hydraulic communication between the grooves 58 and 59 will be reopened so as to drain the hydraulic brake pressure therethrough.

During this brake operation, when the electric circuit, as shown in FIG. 3, delivers a signal indicative of skidding of the wheel, such that the transistor 126 is conductive, the switch 111 is arranged to be closed so as to energize the solenoid 30. The accumulated pressure is now transmitted to the brake hydraulic line and the chambers 66 and 68. At the same time, the flapper valve 80, which is normally held in its illustrated neutral position, is urged so as to be rotated in the counter-clockwise direction an amount proportional to the signal, such that the nozzle 77 is opened so as to reduce the discharge-resistance of the fluid flow out of the fluid chamber 66 in response to the counter-clockwise rotation of the flapper valve 80. Due to the hydraulic pressure within the chamber 68, the spool valve 46 is moved in the left direction whereby hydraulic communication between the grooves 58 and 59 may be opened. This results in decreasing of the brake hydraulic pressure. On the contrary, in case the braking force would be insufficiency, for example against the driver's intention, such that the transistor 127 is conductive, the electric circuit delivers another signal which urges the flapper valve 80 so as to rotate in the clockwise direction. The nozzle 78 would therefore open to reduce the discharge-resistance of fluid flow out of the chamber 68 in response to the clockwise rotation of the flapper valve 80, while the nozzle 77 is now closed. Thus, the spool valve 46 is moved to the right in response to the decreasing of fluid pressure within the chamber 68, and the brake hydraulic pressure may be increased.

The spool valve 46 will be balanced under the following equation:

$$F + \frac{\pi}{4}(A^2 - B^2) PC_1 = \frac{\pi}{4} B^2 PW + \frac{\pi}{4}(A^2 - B^2) PC_2$$

where $F$ is a pedal depressing force acting on the push rod, $Pw$ is a hydraulic brake pressure in the brake means, $A$ is a cross-sectional area of a large diameter portion of the spool valve 46 and $PC_1$ and $PC_2$ are the hydraulic pressures within the chambers 66 and 68, respectively. Accordingly, the hydraulic brake pressure will be controlled in response to the pedal depressing force $F$ and the hydraulic pressures $PC_1$ and $PC_2$.

Remaining brake means, including means which is connected to the conduit 55a, may be actuated in substantially the same manner. More particularly, all brake means may be actuated by the brake pedal 86 but all brake means may also be actuated independently of one another in response to their actuators which associate with the respective electric circuits.

In addition, the solenoid 30 may be adpated so as to always energize during travelling of the vehicle. For example, the actuator 79 and the switch 111 may associate with the means for always applying the small hydraulic pressure to the hydraulic brake line, and so on.

The small hydraulic pressure is maintained at a low value of hydraulic pressure which is insufficient to effect the braking operation within the brake line during non-brake operation. In this case, the accumulated pressure is always transmitted to the control valve assembly 43 during vehicle travel and the flapper valve 80 is always urged to reduce slightly the discharging-resistance of fluid flow out of the chamber 68. Thus, the spool valve 46 is substantially held in a position in which the small accumulated pressure which is insufficient to effect braking operation is transmitted to the brake line through grooves 65 and 58. When the small accumulated pressure will be decreased owing to any failures of the brake line, a suitable alarm means will be actuated to alarm these failures. When the brake pedal 86 is now depressed, the spool valve 46 is moved rightwardly whereby the brake line including the conduits 55 and 28 and the passage 53 is completely interrupted from the drain line 62 while the conduit 42 communicates with the brake hydraulic line. Thus, the brake action will be attained.

Furthermore, in the case that hydraulic pressures are not stored in the accumulators 35 and 35a due to any failures, the switches 104 and 105 will be closed and the switches 106 and 107 will be opened to turn the lamp 112 on. Therefore, the solenoid 30 is energized through the lamp 112 and the spool valve 21 of the change-over valve assembly 16 is moved upwardly, the hydraulic pressure from the pump 10 is directly conveyed to the control valve assembly 43 via the conduit 88. Therefore, the brake operation is still maintained.

Various other modifications and variations of the present invention are obviously possible in light of the above teachings. It is to be understood therefore, that within the scope of the appended claims, the invention may be practiced otherwise than as specifically described herein.

What is claimed as new and desired to be secured by Letters Patent of the United States is:

1. A hydraulic brake pressure control system for a vehicle having a brake pedal, a source of pressurized fluid and an electric circuit for delivering an output signal indicative of an optimum brake control operation comprising:

a housing having a bore and inlet, outlet and drain ports, said inlet ports being connected to said source of pressurized fluid, a spool valve slidably mounted within said bore of said housing for controlling hydraulic communication between said inlet, outlet and drain ports, a push rod associated with said brake pedal and associated mechanically with said spool valve for actuating the latter, a reaction member providing a return force for urging said spool valve in its original position against a pedal depressing force acting on said push rod, said reaction member having one end which is exposed to an output pressure in said outlet port, a pair of hydraulic pressure chambers opposedly formed at both ends of said spool valve and in fluid communication with said source of pressurized fluid through conduit means, said conduit means comprising a first conduit communicating with one of said hydraulic pressure chambers and a second conduit communicating with the other of said hydraulic pressure chambers, each of said first and second conduits having an orifice through which said pressurized fluid may be supplied to said hydraulic pressure chambers, and an actuator electrically connected to said electric circuit for controlling the hydraulic pressure in at least one of said chambers in accordance with said indicating signal whereby said hydraulic pressure in said one chamber will assist said spool valve to move to increase the hydraulic pressure at said outlet port when the hydraulic pressure in said one chamber is greater than that in said other chamber, and the hydraulic pressure in said other chamber will assist said spool valve to move to decrease the hydraulic pressure at said outlet port when the hydraulic pressure in said other chamber is greater than that in said one chamber.

2. A hydraulic brake pressure control system as set forth in claim 1, wherein said push rod and said spool valve are formed as a unit.

3. A hydraulic brake pressure control system as set forth in claim 1, wherein said pair of chambers are hydraulically connected to said source of pressurized fluid, and both effective diameters of said chambers are equal to each other, and said reaction member having an effective cross-sectional area which is equal to that of said push rod.

4. A hydrualic brake pressure control system as set forth in claim 3, wherein said actuator comprises a flapper valve which controls the dischargingresistance of the fluid flow out of said pressure chamber.

5. A hydraulic brake pressure control system as set forth in claim 1, wherein said one end of said reaction member is adapted so as to expand into a bore of said spool valve to thereby define a hydraulic chamber which is communicated with said outlet port.

6. A hydraulic brake pressure control system for a vehicle having a brake pedal, comprising:
a first source of pressurized fluid,
a control valve assembly communicated with said first source of pressurized fluid through a first passage,
a second source of pressurized fluid connected to said first source of pressurized fluid through a second passage, and connected to said control valve assembly through a third passage,
a change-over valve assembly disposed within said first, second and third passages and having a first position in which said first passage is opened and a second position in which said second and third passages are opened,
said control valve assembly comprising a housing having a bore, said housing being formed with inlet, outlet and drain ports, said inlet port being connected to said third passage and said outlet port being adapted to be connected to said first passage through a check valve, a spool valve slidably mounted within said bore of said housing for controlling hydraulic communication between said inlet, outlet and drain ports, a push rod associated with said brake pedal and associated mechanically with said spool valve for actuating the latter, a reaction member providing a return force for urging said spool valve in its original position against a pedal depressing force acting on said spool valve, said reaction member having one end which is exposed to an outlet pressure in said outlet port and having an effective cross-sectional area which is equal to that of said push rod, and a pair of hydraulic pressure chambers oppositely formed at both ends of said spool valve,
an electric circuit delivering an output signal indicating an optimum brake control operation, and
an actuator electrically connected to said electric circuit for controlling the hydraulic pressure in at least one of said chambers in accordance with said indicating signal.

7. A hydraulic brake pressure control system as set forth in claim 6, wherein said first source of pressurized fluid comprises a hydraulic pump and said second source of pressurized fluid comprises at least one accumulator.

8. A hydraulic brake pressure control system as set forth in claim 7, wherein said spool valve and said push rod are formed as a unit.

9. A hydraulic brake pressure control system as set forth in claim 7, wherein said pair of chambers are hydraulically connected to said third passage and the discharging-resistance of the fluid flow out of said chambers will be controlled by a flapper valve of said actuator, and both effective diameters of said chambers are equal to each other.

10. A hydraulic brake pressure control system as set forth in claim 7, further comprising means for actuating said change-over valve assembly into said first position when a predetermined pressure is stored in said accumulator.

* * * * *